S. T. STOUT.
ANIMAL-TRAP.

No. 186,898. Patented Jan. 30, 1877.

WITNESSES
Robert Everett
George E. Upham

INVENTOR.
S. T. Stout
Gilmore, Smith & Co.
ATTORNEYS.

UNITED STATES PATENT OFFICE.

STEPHEN TAYLOR STOUT, OF CEDAR GROVE, GEORGIA, ASSIGNOR OF ONE-THIRD HIS RIGHT TO WILLIAM C. KILGORE, OF SAME PLACE.

IMPROVEMENT IN ANIMAL-TRAPS.

Specification forming part of Letters Patent No. 186,898, dated January 30, 1877; application filed November 18, 1876.

*To all whom it may concern:*

Be it known that I, STEPHEN T. STOUT, of Cedar Grove, in the county of Walker and State of Georgia, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
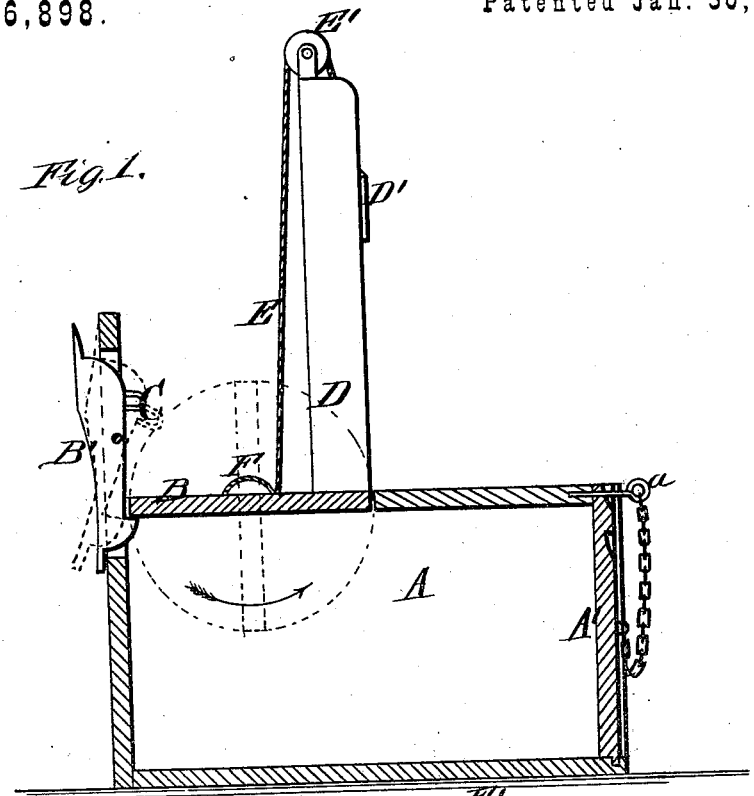
Figure 2:
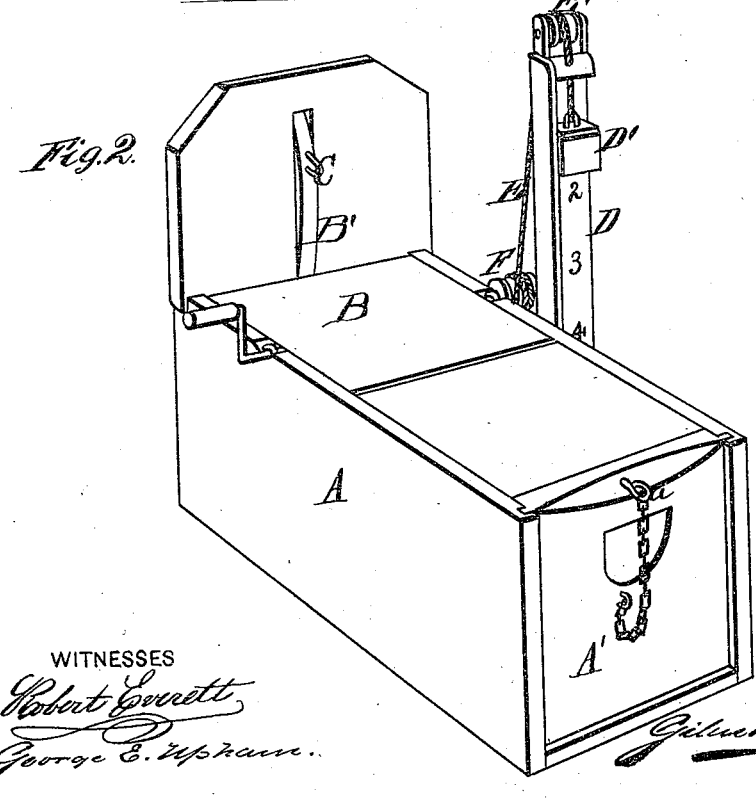

Figure 1 of the drawings is a representation of a central vertical section of my animal-trap, and Fig. 2 is a perspective view of the same.

This invention relates to animal-traps; and the novelty consists in a pivoted platform operated by a weight, which platform serves as a part of the trap roof, and at the same time acts as a tilting platform, which is held in position by a trigger, to which the bait is attached; and it also consists in a graduated standard and sliding door applied to said trap, substantially as hereinafter specified.

In the accompanying drawings, Fig. 1, A represents the trap-box, and A' the sliding door, through which the entrapped animals are removed. The letter $a$ represents key and chain by which the door is secured. B designates the tilting platform; B', the trigger, and C the staple or hook to which the bait is attached. D represents a graduated standard; D', the weight; E, the cord or chain; E', the pulley, and F the windlass by which the weight is raised, and the trap is prepared for operation, which operation is as follows:

The rear end of the trap, to which the trigger is attached, is turned next or toward the person winding the windlass, and the weight is wound up to the cipher indicated upon the graduated bar or standard. The platform at this point becomes engaged or held in position by the trigger, the bait being attached to the staple or hook on the trigger, and the sliding door secured by the key. The animal, in order to obtain the bait, must step upon the tilting platform, and when it seizes the bait the trigger releases the tilting platform, which revolves, precipitating the animal into the trap. The weight D' at the same time accelerates this revolution and restores it to its original position, and it is ready to receive another animal. Each revolution is registered upon the graduated standard, as by each revolution of the tilting platform the weight is lowered one space or number, and thus the number of animals within the trap is registered.

By the means last mentioned the operator is enabled at any time to know the exact number of animals in the trap, and, by means of the sliding door, to remove them.

What I claim as new, and desire to secure by Letters Patent, is—

1. In an animal-trap, a graduated gage, by means of which the number of animals entrapped is indicated, substantially as described.

2. In an animal-trap, the graduated standard D, in combination with the weight D', cord E, pulley E', trigger B', and tilting platform B, as and for the purpose set forth.

In testimony that I claim the above I have hereunto subscribed my name in the presence of two witnesses.

STEPHEN TAYLOR STOUT.

Witnesses:
PERRY A. WALL,
A. M. SMITH.